(12) United States Patent
Yamada et al.

(10) Patent No.: US 12,078,503 B2
(45) Date of Patent: Sep. 3, 2024

(54) DISPLAY LIGHT EMITTING DEVICE

(71) Applicants: NS WEST INC., Shobara (JP); SHOEI CO., LTD., Tokyo (JP)

(72) Inventors: Manabu Yamada, Hiroshima (JP); Kousuke Aoi, Hiroshima (JP)

(73) Assignees: NS West Inc., Hiroshima (JP); Shoei Co., Ltd., Tokyo (JP)

( * ) Notice: Subject to any disclaimer, the term of this patent is extended or adjusted under 35 U.S.C. 154(b) by 198 days.

(21) Appl. No.: 17/785,808

(22) PCT Filed: Sep. 30, 2020

(86) PCT No.: PCT/JP2020/037208
§ 371 (c)(1),
(2) Date: Jun. 15, 2022

(87) PCT Pub. No.: WO2021/124641
PCT Pub. Date: Jun. 24, 2021

(65) Prior Publication Data
US 2023/0058898 A1 Feb. 23, 2023

(30) Foreign Application Priority Data
Dec. 20, 2019 (JP) .................. 2019-230324

(51) Int. Cl.
*G01C 21/36* (2006.01)
*B60K 35/00* (2006.01)
(Continued)

(52) U.S. Cl.
CPC .......... *G01C 21/365* (2013.01); *B60K 35/00* (2013.01); *G01C 21/3632* (2013.01);
(Continued)

(58) Field of Classification Search
CPC ... B60K 35/00; G01C 21/365; G01C 21/3632
See application file for complete search history.

(56) References Cited

U.S. PATENT DOCUMENTS 6,249,740 B1 6/2001 Ito et al.
6,266,613 B1 7/2001 Nimura et al.
(Continued)

FOREIGN PATENT DOCUMENTS

DE 19944067 A1 3/2001
EP 3438805 A1 2/2019
(Continued)

OTHER PUBLICATIONS

Notice of Reasons for Refusal for the corresponding JP application No. 2019-230324 dated Oct. 31, 2023, 8 pages.
(Continued)

*Primary Examiner* — Seth A Silverman
(74) *Attorney, Agent, or Firm* — Procopio, Cory, Hargreaves & Savitch LLP

(57) ABSTRACT

When the distance indicated by distance information received by a Bluetooth module (31) is less than a predetermined first reference distance (KY1), a guidance image (33) including a distance image (33a) and a direction image (33b) is generated, and this guidance image (33) is displayed on a combiner (26) of a helmet (20). By stopping the display of the distance image (33a) of the guidance image (33) and continuing to display the direction image (33b) from when the distance indicated by the distance information becomes less than a second reference distance (KY2) shorter than the first reference distance (KY1) to when the guidance point is reached, the driver's attention is focused on the direction image (33b), so that a mistake in the direction of travel at the guidance point can be prevented.

9 Claims, 9 Drawing Sheets

(51) Int. Cl.
*B60K 35/23* (2024.01)
*B60K 35/28* (2024.01)
*B60K 35/29* (2024.01)
*B60K 35/85* (2024.01)
*B62J 50/22* (2020.01)

(52) U.S. Cl.
CPC .............. *B60K 35/23* (2024.01); *B60K 35/28* (2024.01); *B60K 35/29* (2024.01); *B60K 35/85* (2024.01); *B60K 2360/166* (2024.01); *B60K 2360/182* (2024.01); *B60K 2360/5911* (2024.01); *B60Y 2200/12* (2013.01); *B62J 50/22* (2020.02)

(56) References Cited

U.S. PATENT DOCUMENTS

| | | | |
|---|---|---|---|
| 2001/0027272 A1* | 10/2001 | Saito | A61B 1/0005 600/429 |
| 2013/0024117 A1* | 1/2013 | Pavetti | G01C 21/166 701/538 |
| 2014/0167986 A1 | 6/2014 | Parada et al. | |
| 2016/0044276 A1* | 2/2016 | Shearman | A42B 3/042 348/207.1 |
| 2016/0178387 A1* | 6/2016 | Yamasaki | G01C 21/20 701/428 |
| 2016/0327791 A1* | 11/2016 | Kasano | B60K 35/00 |
| 2017/0249789 A1 | 8/2017 | Mizuno et al. | |
| 2020/0050285 A1* | 2/2020 | Kwon | G09F 9/30 |

FOREIGN PATENT DOCUMENTS

| | | |
|---|---|---|
| EP | 3461672 A1 | 4/2019 |
| JP | H4-116877 U | 10/1992 |
| JP | H8-190696 A | 7/1996 |
| JP | H9-105642 A | 4/1997 |
| JP | 2000-113388 A | 4/2000 |
| JP | 2002-174527 A | 6/2002 |
| JP | 2008232940 A | 10/2008 |
| JP | 2014-52345 A | 3/2014 |
| JP | 2014-235054 A | 12/2014 |
| JP | 2015136953 A | 7/2015 |
| JP | 2016-503160 A | 2/2016 |
| JP | 2016-90515 A | 5/2016 |
| JP | 2017-156897 A | 9/2017 |

OTHER PUBLICATIONS

European Patent Office. Extended European Search Report dated Dec. 21, 2022. Application No./Patent No. 20903660.7-1012 / 4079553 PCT/JP2020/037208. Name of Applicant: NS West Inc., et al. English Language. 8 pages.

International Search Report for the corresponding PCT Application No. PCT/JP2020/037208 dated Nov. 10, 2020, 2 pages.

Office Action for corresponding Chinese application No. 2020800888967 dated May 14, 2024, 17 pages.

* cited by examiner

DISPLAY LIGHT EMITTING DEVICE

CROSS REFERENCE TO RELATED APPLICATIONS

This application is the U.S. National Stage Application under 35 U.S.C. § 371 of International Application No. PCT/JP2020/037208, filed Sep. 30, 2020, designating the U.S. and published as WO 2021/124641 A1 on Jun. 24, 2021, which claims the benefit of Japanese Patent Application No. JP2019-230324, filed Dec. 20, 2019. Any and all applications for which a foreign or a domestic priority is claimed is/are identified in the Application Data Sheet filed herewith and is/are hereby incorporated by reference in their entirety under 37 C.F.R. § 1.57.

TECHNICAL FIELD

The present invention relates to a display light emitting device that displays a guidance image on a head-up display device of a vehicle, and more particularly, to a display light emitting device that emits display light to display a guidance image on a head-up display device mounted on a helmet.

BACKGROUND ART

Recently, as a display light emitting device that emits display light to display a guidance image on a head-up display device of a vehicle, it has been known to emit display light of a simple display from a display light emitting device to a combiner to provide display in order that the driver is not hindered from making a correct judgment while driving the vehicle. For example, as an example of a display light emitting device of a head-up display device, Patent Literature 1 discloses to emit display light so that a display image regarding the distance from the destination to the own vehicle (distance image) and a display image of an arrow indicating right and left turn information at the guidance point (direction image) are displayed all the time on a head-up display device when the own vehicle reaches a location a first predetermined distance (300 m) away from the guidance point where the own vehicle must turn left or right. Moreover, when the own vehicle reaches a location nearer to the guidance point than the location of the first predetermined distance and a second predetermined distance (100 m) away from the guidance point thereafter, the display of the display image regarding the distance (distance image) and the display image regarding the driving operation (direction image) is switched from all-the-time display to flashing display.

CITATION LIST

Patent Literature

[Patent Literature 1] Japanese Laid-Open Patent Publication No. H08-190696

SUMMARY OF INVENTION

Technical Problem

In a head-up display device of a vehicle where limited information is displayed, in many cases, a rough value in units of several hundreds of meters is measured as the distance to the guidance point and the value is displayed. On the contrary, according to Patent Literature 1, an arrow and the distance are displayed to provide route guidance. At locations far from the guidance point, the distance image is shown by a numerical value and the direction image indicating the direction of travel is shown by an arrow that is always lit, and at a location near the guidance point, the numerical value of the distance image and the arrow of the direction image are both flashed, so that at the location near the guidance point, rather the numerical value indicating the distance attracts the driver's attention and adhering to the numerical value, the driver can mistake a wrong point for the guidance point.

The present invention is made in view of the above-described prior art, and an object thereof is to make the driver recognize that the guidance point is approaching and at the same time, prevent the guidance display from hindering the driver's correct judgement when a location near the guidance point is reached.

Solution to Problem

To attain the above-mentioned object, according to the present invention, when the distance to the guidance point becomes within a predetermined distance, both the distance image and the direction image are displayed, and when the guidance point becomes nearer, the display of the direction image up to the guidance point is continued and the display of the distance image is erased.

That is, according to a first aspect of the invention, a display light emitting device that emits display light to display a guidance image on a combiner mounted on a helmet is provided with;

a wireless communication portion that receives, from a communication device, guidance information including distance information indicative of a distance to a predetermined guidance point and direction information indicative of a direction of travel at the guidance point; and an image control module having: an image generating portion that generates a guidance image including a distance image indicative of the distance to the guidance point based on the distance information and a direction image indicative of the direction of travel at the guidance point based on the direction information; and an image emitting portion that emits display light to display the guidance image on the combiner, and controls operations of the image generating portion and the image emitting portion, and the image control module performs control so that, when a condition is satisfied that the distance indicated by the distance information is less than a predetermined first reference distance, the distance image and the direction image are generated by the image generating portion and display light to display the guidance image including the generated distance image and direction image on the combiner is emitted from the image emitting portion, and performs control so that from when a condition is satisfied that the distance indicated by the distance information is less than a second reference distance shorter than the first reference distance to when the guidance point is reached, the display of the distance image of the guidance image is stopped and display light to continue to display the direction image is emitted.

According to a second aspect of the invention, in the first aspect of the invention, the image control module performs control so that until a third reference distance shorter than the first reference distance is reached, the direction image generated by the image generating portion is a first route direction image, and that when a condition is satisfied that the distance indicated by the distance information is less than the third reference distance, the direction image generated by the image generating portion continues to be emitted from the image emitting portion to the combiner as a second route direction image formed of a display image different from the first route direction image.

According to a third aspect of the invention, in the second aspect of the invention, the image control module performs control so that when a condition is satisfied that the distance indicated by the distance information is less than a fourth reference distance shorter than the third reference distance, a third route direction image formed of a display image different from the first route direction image and the second route direction image is emitted from the image emitting portion to the combiner.

According to a fourth aspect of the invention, in the third aspect of the invention, the distance from the guidance point to the second reference distance is shorter than the distance from the guidance point to the third reference distance and is longer than the distance from the guidance point to the fourth reference distance.

According to a fifth aspect of the invention, in any one of the first to fourth aspects of the invention, the first route direction image and the second route direction image each include an arrow image, and the arrow image of the first route direction image and the arrow image of the second route direction image are different in display condition.

According to a sixth aspect of the invention, in the third or the fourth aspect of the invention, the first route direction image, the second route direction image and the third route direction image each include an arrow image, and the arrow images of the first route direction image, the second route direction image and the third route direction image are different in display condition.

According to a seventh aspect of the invention, in any one of the first to sixth aspects of the invention, the distance interval from the location of the second reference distance to the guidance point is shorter than the distance interval from the location of the first reference distance to the location of the second reference distance.

According to an eighth aspect of the invention, in any one of the first to seventh aspects of the invention, a fifth reference distance is set that is from the guidance point to a location further away from the guidance point than the location of the first reference distance, the fifth reference distance is set at a plurality of points every distance interval longer than the first reference distance, and the image control module performs control so that the guidance image including the distance image and the direction image is displayed for a set predetermined period of time when each fifth reference distance is reached.

According to a ninth aspect of the invention, in the eighth aspect of the invention, the display time of the guidance image displayed when the fifth reference distance is reached is not more than 30 seconds.

Advantageous Effects of Invention

According to the first aspect of the invention, when the distance to the guidance point becomes the first reference distance, the distance image and the direction image are displayed, and when the distance to the guidance point becomes the second reference distance, the display of the distance image is stopped and the display of the direction image is continued until the guidance point is reached; for this reason, not only the driver can strongly recognize that the guidance point is approaching but also the distance image can be prevented from obstructing a correct judgement by the driver.

According to the second aspect of the invention, when the distance to the guidance point becomes less than the third reference distance, the second route direction image different from the first route direction image is displayed on the combiner; for this reason, not only the driver's attention is focused on the change of the direction image but also the second route direction image is changed so as to be conspicuous in order that the driver can focus attention thereon, so that the driver can be prevented from mistaking a wrong direction for the direction of travel at the guidance point.

According to the third aspect of the invention, when the distance to the guidance point becomes less than the fourth reference distance shorter than the third reference distance, the third route direction image different from the first route direction image and the second route direction image is displayed on the combiner; for this reason, the driver can focus attention only on the third route direction image, so that the driver can be surely prevented from mistaking a wrong direction for the direction of travel at the guidance point.

According to the fourth aspect of the invention, since the second reference distance is a distance between the third reference distance and the fourth reference distance, after the distance becomes less than the third reference distance and the display is changed from the first route direction image to the second route direction image to thereby erase the distance image and attention is focused only on the direction image, the display is changed from the second route direction image to the third route direction image after a little bit of traveling with the distance image erased. Consequently, not only the driver can recognize that the guidance point is near but also the guidance image where the distance image is erased makes the direction of travel very comprehensible.

According to the fifth aspect of the invention, at the time of traveling, in the display condition of the arrow image, a change occurs such as a change of the color of the arrow, a change of the flashing condition of the arrow, a change of the thickness of the arrow and a combination thereof, so that the arrow can be made more noticeable to the driver's eyes.

According to the sixth aspect of the invention, since the display condition of the arrow image is changed in two steps at the time of traveling, the change of the arrow is surely burned into the driver's eyes. In particular, since switching to the second route direction image is made after the distance image is erased from the first route direction image where both the direction image and the distance image are displayed, the driver not only can easily recognize that the guidance point is approaching but also can surely grasp the direction of travel.

According to the seventh aspect of the invention, since the distance interval from the location of the second reference distance to the guidance point is shorter than the distance interval from the location of the first reference distance to the location of the second reference distance at the time of traveling, the time during which the distance image in the guidance image is not displayed is short. Consequently, the possibility decreases that the driver loses sight of or mistakes the guidance point, so that the driver can pass the guidance point without getting lost according to the direction image displayed in the guidance image.

According to the eighth aspect of the invention, since at the fifth reference directions set at locations ahead of the location of the first reference distance at the time of traveling, for example, display is provided in the guidance image for a short period of time every turning point value as a rough indication of each distance, the driver becomes aware that the guidance point is gradually approaching while understanding that the direction of travel is correct without the traveling being hindered, so that the driver can drive the vehicle at ease.

According to the ninth aspect of the invention, since the guidance image is displayed only a little at each turning point value as the rough indication of the distance, the driver can drive concentratedly while obtaining necessary information.

DESCRIPTION OF EMBODIMENTS

First Embodiment

Hereinafter, a first embodiment of the present invention will be described based on the drawings.

Figure 1:
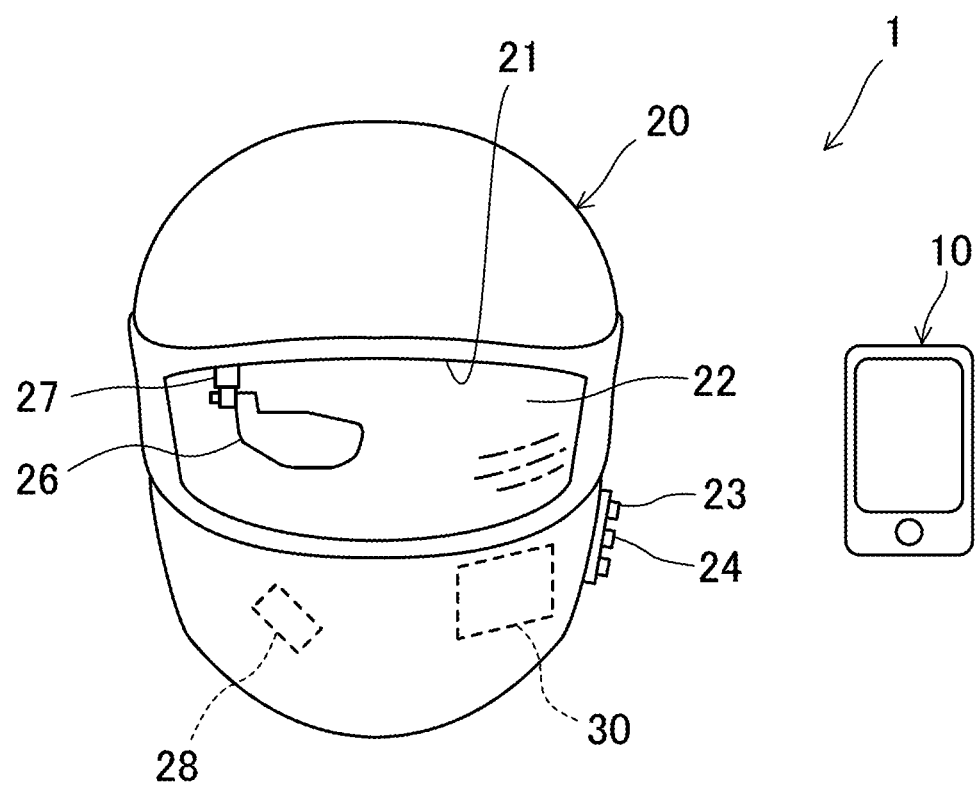
FIG. 1 is a view showing the structure of a navigation system provided with a display light emitting device according to a first embodiment of the present invention.
Figure 2:
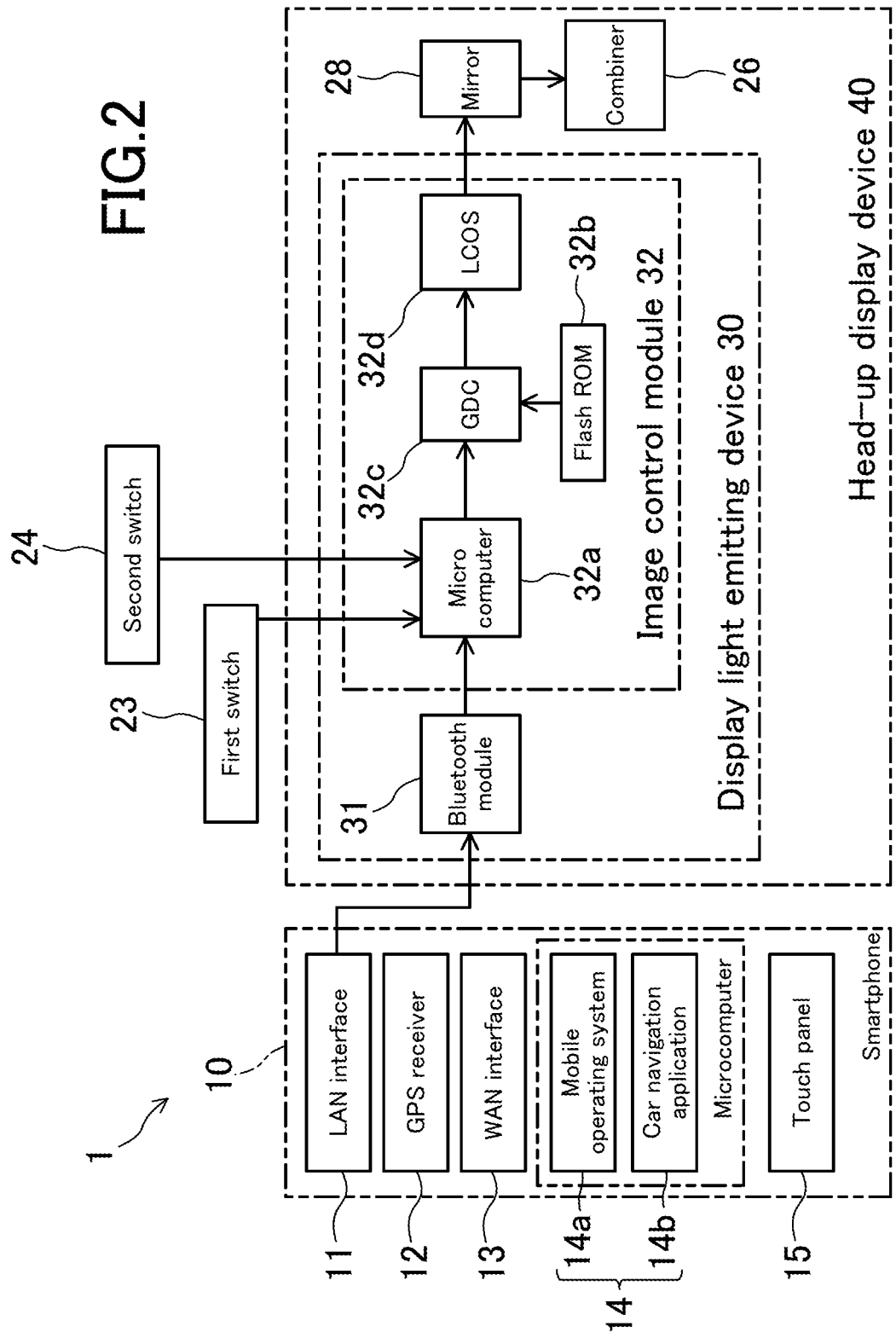
FIG. 2 is a functional block diagram showing the structure of the navigation system provided with the display light emitting device according to the first embodiment of the present invention.

FIG. 1 is a view showing the structure of a navigation system which is an example where the present invention is applied to a motorcycle. FIG. 2 is a functional block diagram showing the structure of the navigation system provided with a display light emitting device according to the first embodiment of the present invention. As shown in FIG. 1, this navigation system 1 is provided with a smartphone 10 as a communication device and a helmet 20 of the motorcycle. The navigation system 1 is also employable for vehicles other than motorcycles such as jet skis, bicycles and snowmobiles (snow bikes). The smartphone 10 may be detachably attached to the motorcycle or may be accommodated in a bag or the like capable of receiving GPS signals.

As shown in FIG. 2, the smartphone 10 is provided with: a LAN interface 11 that performs wireless communications using Bluetooth (trademark); a GPS receiver 12; a WAN interface 13 that transmits and receives audio signals through a mobile-phone line; a microcomputer 14 as a signal processor; and a touch panel 15 as an input portion. The microcomputer 14 is provided with: a mobile operating system 14a as the OS of the smartphone 10; a car navigation service application (hereinafter, referred to as "car navigation application") 14b that runs on the mobile operating system 14a by using location information obtained by the GPS receiver 12 and the like. The smartphone 10 is structured so as to be capable of automatically searching for a route from the current location to the destination based on the location information (current location information) obtained by the GPS receiver 12 and the destination information inputted on the touch panel 15 and making route setting by using the microcomputer 14. The car navigation application 14b is structured so as to calculate the distance from the current location to the next guidance point and the time to when the next guidance point is reached from the current location, based on map information and current location information. On the touch panel 15, guidance information up to a predetermined guidance point is displayed. Although concrete examples of the guidance information display will be described later in detail, for example, distance information indicative of the distance to the guidance point and direction information indicative of the direction of travel at the guidance point are displayed.

As shown in FIG. 1, in the center on the front surface of the helmet 20, a window hole 21 is formed that has a substantially rectangular shape extending in the horizontal direction. The helmet 20 is provided with a shield 22 having translucency and being substantially U-shaped in plan view. Both end portions of the window hole 21 are pivotally supported by the side wall portions of the helmet 20, respectively, and move rotationally in the vertical direction, thereby opening and closing the window hole 21. A plurality of switches including a first switch 23 and a second switch 24 are disposed on the left side of the window hole 21 on the outer surface of the helmet 20 when viewed from the helmet wearer, that is, in a position corresponding to an ear of the helmet wearer. The first switch 23 activates a display light emitting device 30 (described later) of a head-up display device 40 by being long-pressed. The first switch 23 forcibly stops the display light emitting device 30 by being short-pressed. The second switch 24 is a switch of multiple functions including telephone incoming and telephone conversation.

Moreover, a position to the right of the center in the horizontal direction when viewed from the helmet wearer on the upper edge of the window hole 21 of the helmet 20, a plate-like semi-transparent combiner 26 is attached from the inside of the helmet 20 through an attachment member 27. The display light emitting device 30 according to the embodiment of the present invention and a mirror 28 that projects to the combiner 26 the display light emitted by the display light emitting device 30 are incorporated below the window hole 21 of the helmet 20. The display light emitting device 30, the combiner 26 and the mirror 28 constitute the head-up display device 40.

As shown in FIG. 2, the display light emitting device 30 is provided with: a Bluetooth module 31 (wireless communication portion) capable of communicating with the smartphone 10 by using Bluetooth; and an image control module 32 that generates a guidance image to be displayed on the combiner 26 based on the information received by the Bluetooth module 31 and emits display light to display the generated guidance image on the combiner 26.

The Bluetooth module 31 receives, from the LAN interface 11 of the smartphone 10, guidance information such as information on the route to a set guidance point, distance information indicative of the distance to the set guidance point, direction information indicative of the direction of travel at the guidance point, speed information indicative of the current speed and the time required to reach the guidance point.

The image control module 32 is provided with: a microcomputer 32a that receives, from the Bluetooth module 31, the guidance information received from the LAN interface 11 and generates a guidance image 33 from the received guidance information; a flash ROM (Read Only Memory) 32b that stores images and the like; a GDC (Graphic Display Controller) 32c (image generating portion); and an LCOS (Liquid Crystal on Silicon) 32d (image emitting portion) that emits display light to display the generated image on the combiner 26.

Figure 7:
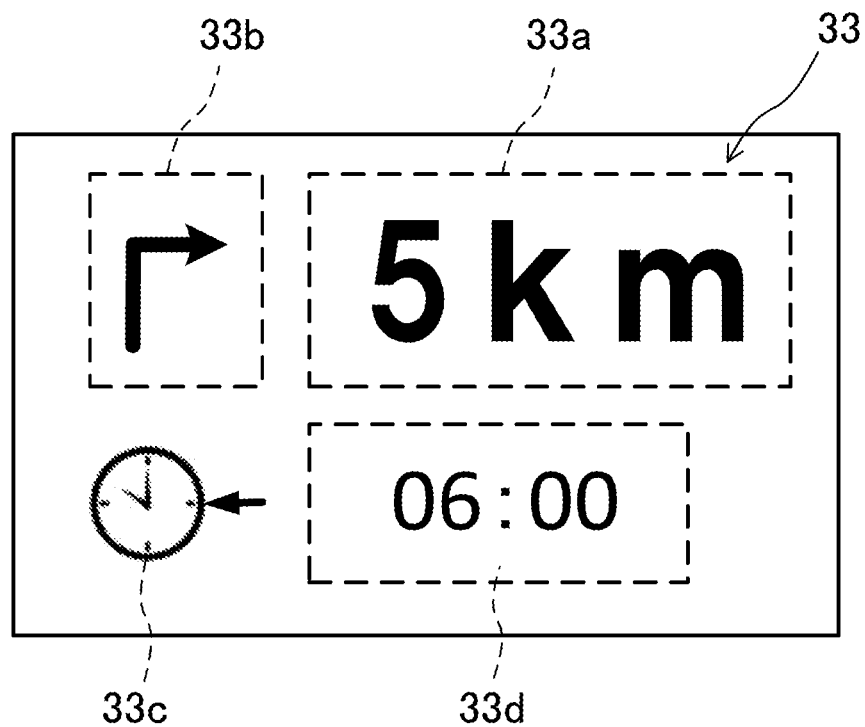
FIG. 7 is a view showing an example of the guidance image outputted by the image output portion of the display light emitting device according to the first embodiment of the present invention.

In accordance with an instruction from the microcomputer 32a, the image control module 32 controls the GDC 32c so as to generate the guidance image 33 by combining the guidance information such as the distance information and the direction information received from the Bluetooth module 31, images stored in the flash ROM 32b and the like, and controls the LCOS 32d so as to emit display light corresponding to the generated guidance image 33. In the guidance image 33, for example, as shown in FIG. 7, a distance image 33a on the distance to the guidance point is displayed by a numerical value in the upper right part, and a direction image 33b indicative of the direction of travel at the guidance point is displayed by an arrow in the upper left part. Moreover, in the guidance image 33, a time image 33c indicative of the time required to reach the guidance point is displayed by minutes and seconds in the lower right part, and a time-of-day image 33d as an estimated arrival time is displayed by a clock diagram in the lower left part. The distance image 33a is displayed in the unit of "km" when the distance to the guidance point is long, and is displayed in the unit of "m" when the distance to the guidance point is less than 1 km.

The LCOS 32d emits display light to display the guidance image 33 generated by the GDC 32c on the combiner 26.

The output of the guidance image 33 by the LCOS 32d can be forcibly stopped by the first switch 23 being short-pressed.

Figure 3:
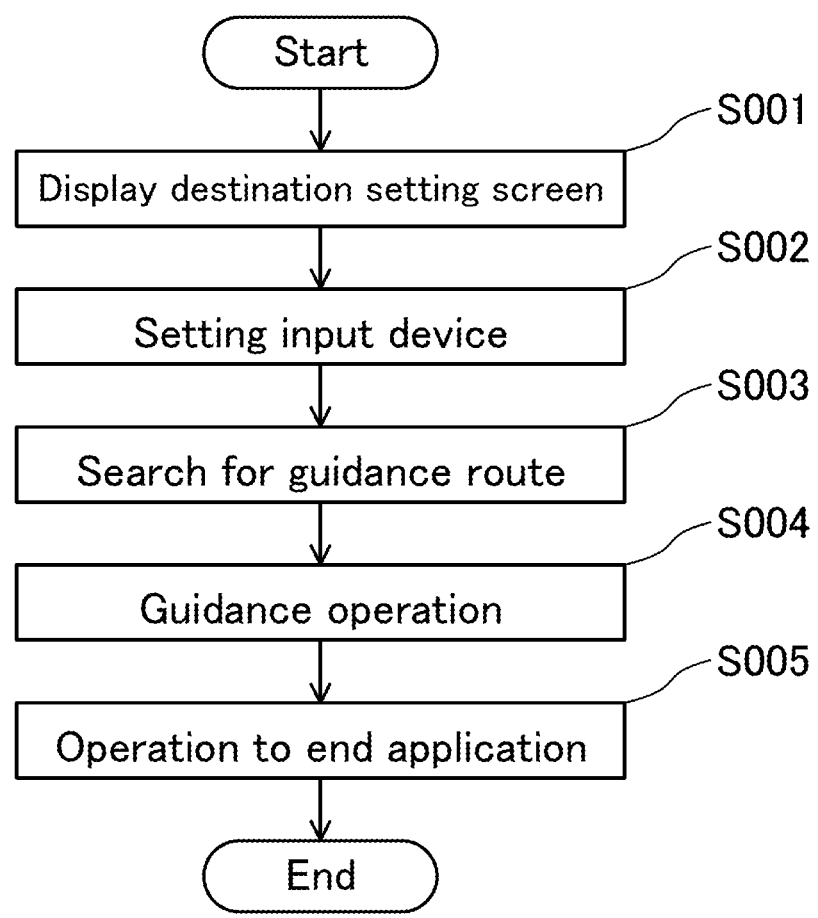
FIG. 3 is a flowchart showing the processing performed by a microcomputer of a smartphone when a car navigation application is executed.

In the navigation system 1 structured as described above, the processing shown in the flowchart of FIG. 3 is performed by the microcomputer 14 of the smartphone 10 executing the car navigation application 14b.

First, at step S001, a screen to prompt the user to set a destination is displayed on the touch panel 15.

Then, at step S002, when an input operation to set a destination by the user is performed on the touch panel 15, the set destination is stored as the destination of the guidance object.

Then, at step S003, the guidance route from the point of departure to the destination of the guidance object stored at step S002 is searched for, and the guidance route obtained by the search is stored.

Figure 4:
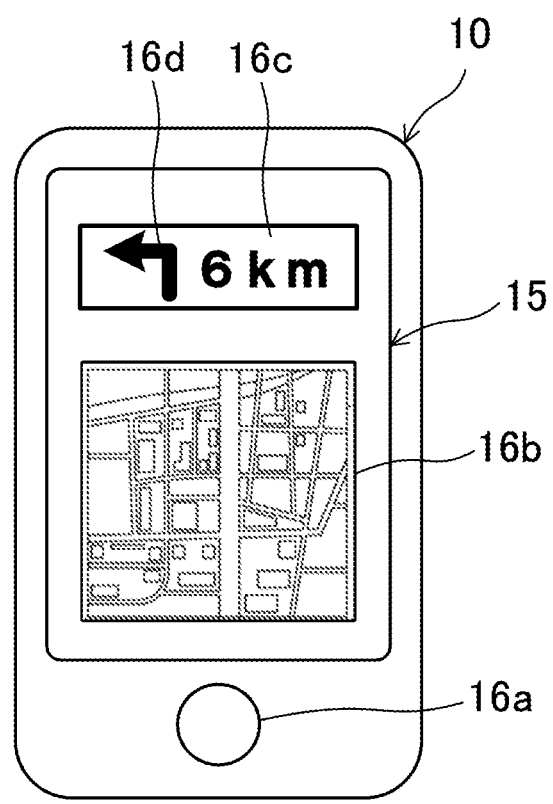
FIG. 4 is a view showing an image displayed on a touch panel of the smartphone during a guidance operation.

Thereafter, at step S004, a guidance operation is executed in accordance with the guidance route stored at step S003. The microcomputer 14 during the guidance operation obtains, every second, the distance information indicative of the distance to a predetermined guidance point such as the next intersection and the direction information indicative of the direction of travel at the guidance point according to the guidance route obtained by the search using the GPS receiver 12. Then, based on the obtained distance information and direction information, the map around the current location, the distance to the guidance point, the direction of travel at the guidance point and the like are outputted and displayed on the touch panel 15 as the guidance information. FIG. 4 shows an example of the image displayed on the touch panel 15 during the guidance operation. In FIG. 4, 16a is an activation switch of the smartphone, 16b is the map around the current location, 16c is the distance to the guidance point, and 16d is the direction of travel at the guidance point. Moreover, during the guidance operation, the microcomputer 14 transmits (outputs) the distance information and the direction information obtained by the execution of the car navigation application 14b, as the guidance information by wireless communication through the LAN interface 11.

During the guidance operation, at step S005, when an input operation to end the car navigation application 14b by the user is performed on the smartphone 10, the microcomputer 14 ends the guidance operation.

Hereinafter, an operation of the navigation system 1 structured as described above will be described based on FIGS. 5 to 10. In the following, a case where the navigation system 1 is activated at a location where a motorcycle is not less the 5 km away will be described as an example.

First, when the driver of a motorcycle or the like wears the helmet 20 and long-presses the first switch 23 while carrying the smartphone 10 where the car navigation application 14b is running, the display light emitting device 30 is activated. The smartphone 10 where the car navigation application 14b is running transmits the distance information and the direction information updated every second, by wireless communication by the LAN interface 11 as the guidance information up to the guidance point such as the next intersection. After activated, the display light emitting device 30 repetitively executes a stationary operation while the wireless communication with the smartphone 10 is connected by the Bluetooth module 31.

In the stationary operation, it is determined whether the motorcycle that the driver is driving reaches a predetermined turning point value (fifth reference distance KY5) or not, and when the motorcycle reaches the predetermined turning point value, the guidance image 33 is displayed to notify the driver that the guidance route is correct and that the motorcycle is gradually approaching the guidance point. Specifically, when the distance D from the current location to the guidance point is more than 5 km, it is determined that the motorcycle is considerably away from the guidance point and the display of the guidance image 33 of the stationary operation is omitted, whereas when the motorcycle reaches the turning point value, that is, 5 km, the guidance image 33 is displayed for a short period of time (for example, 10 seconds). Then, after the guidance image 33 is displayed for 10 seconds, the display of the guidance image 33 is stopped. As the guidance image 33, for example as shown in FIG. 7, the direction of travel, the distance to the guidance point, the estimated time of arrival and the like are displayed. Such short-time display of the guidance image 33 is repeated also when the motorcycle reaches other turning point values (fifth reference distances KY5) 4 km, 3 km, 2 km and 1 km. This display enables the driver to recognize that the guidance route is correct and that the motorcycle reaches the turning point value of a predetermined distance and is gradually approaching the guidance point. For example, when running at an average speed of 36 km per hour in an urban area, the motorcycle travels 100 m for ten seconds, and when the motorcycle reaches a turning point value such as 5 km, the guidance image 33 is displayed only while the motorcycle is running a distance of 100 m. Moreover, for example, in a case where an interchange is the guidance point when the motorcycle is running on an express way, the motorcycle travels 200 m for ten seconds when running at an average speed of 72 km per hour, and when the motorcycle reaches a turning point value such as 5 km, the guidance image 33 is displayed while the motorcycle is running a succeeding distance of 200 m. Then, for example, when the location of a first reference distance KY1 as the turning point value where the distance to the guidance point is 500 m is reached, the guidance image 33 is displayed all the time to provide stationary display that makes the driver recognize that the guidance point is approaching and that can surely guide the driver to the guidance point.

This stationary operation will be described in detail based on the flowchart of FIG. 5.

First, by the first switch 23 being long-pressed, the display light emitting device 30 of the head-up display device 40 is activated, and the process proceeds to step S101. At this step S101, a count value k is initialized to 1 by the microcomputer 32*a* of the image control module 32, and the process proceeds to step S102. The count value is set merely for the sake of convenience.

Then, at step S102, the Bluetooth module 31 receives the distance information updated and transmitted every second from the smartphone 10 where the car navigation application 14*b* is running, and the process proceeds to step S103.

At step S103, the microcomputer 32*a* of the image control module 32 determines whether a distance condition that a distance D indicated by the distance information received by the Bluetooth module 31 (the distance to the guidance point) is less than a predetermined reference distance $R_k$ is satisfied or not. Here, the count value k starts with k=1 when this display light emitting device 30 is activated, and successively becomes k+1, and as the count value k becomes k=1, 2, 3, 4, 5 and 6, $R_k$ successively becomes $R_1$ to $R_6$. In the first embodiment of the present invention, $R_1$ to $R_6$ are set as follows: $R_1$=5 km, $R_2$=4 km, $R_3$=3 km, $R_4$=2 km, $R_5$=1 km, and $R_6$=500 m.

When the result of the determination is NO at S103, since it is a case where the distance condition that the distance from the current location to the guidance point is less than the reference distance $R_k$ is not satisfied, the process proceeds to step S104. That is, since the count value k=1 at first and $R_k$=$R_1$=5 km, it is determined whether the distance D is D≤5 km (fifth reference distance KY5) or not. Since the current location of travel (D>5 km) is not less than 5 km away from the guidance point and the distance condition (D≤5 km) is not satisfied, the process proceeds to step S104 where the next reception is waited for and the display of the guidance image 33 of the stationary operation is not executed.

At step S104, since the current location of travel is not less than 5 km away from the guidance point, the display of the guidance image 33 of the stationary operation is omitted, and the process waits until the distance information and the direction information transmitted by the smartphone 10 are newly received by the Bluetooth module 31 and returns to step S102. That is, since the distance D during traveling is not less than 5 km, the process proceeds from step S104 to S102 and the determination at step S103 is repeated until the distance information updated every second becomes not more than 5 km.

On the other hand, when the location of travel updated every second becomes D≤5 km, since the distance condition is satisfied, the determination result is YES at step S103, and the process proceeds to step S105. At step S105, the microcomputer 32*a* determines whether the count value k is 6 or not. When the count value k is not 6, the determination result is NO, and the process proceeds to step S106. On the other hand, when the count value k is 6, the determination result is YES, and the process proceeds to step S109. That is, k=6 is D6=500 m, and it is determined whether or not the location of the distance D is not more than 500 m (first reference distance KYT) which is a distance near the guidance point. When it is not more than 500 m, the determination result is YES, and the process proceeds to step S109 where determining that a distance near the guidance point is reached, the display of the guidance image 33 is performed. On the other hand, when the location of the distance D is not less than 500 mm away from the guidance point, the determination result is NO, and the process proceeds to step S106 where another guidance image 33 indicating that a distance near the guidance point is not reached is displayed.

At step S106, the microcomputer 32*a* determines whether the distance D $R_{k+1}$ is satisfied or not. When the distance D $R_{k+1}$ is not satisfied, the determination result is NO, and the process proceeds to step S107. On the other hand, when it is satisfied, the determination result is YES, and the process proceeds to step S108. That is, in the above-described case, since the count value k=1, $R_{k+1}$=$R_2$=4 km, and it is determined whether the distance D to the guidance point satisfies the distance condition that D≤4 km (fifth reference distance KY5) or not. Although D<5 km at the location of travel at this time and the distance is updated every second, since the microcomputer 32*a* makes the determination within a short period of time of several microseconds, it can be said that the distance D at the current location of travel is between 5 km and 4 km. Therefore, since the distance D≤$R_2$ (4 km) is not satisfied, the determination result is NO, and the process proceeds to step S107.

Figure 6:
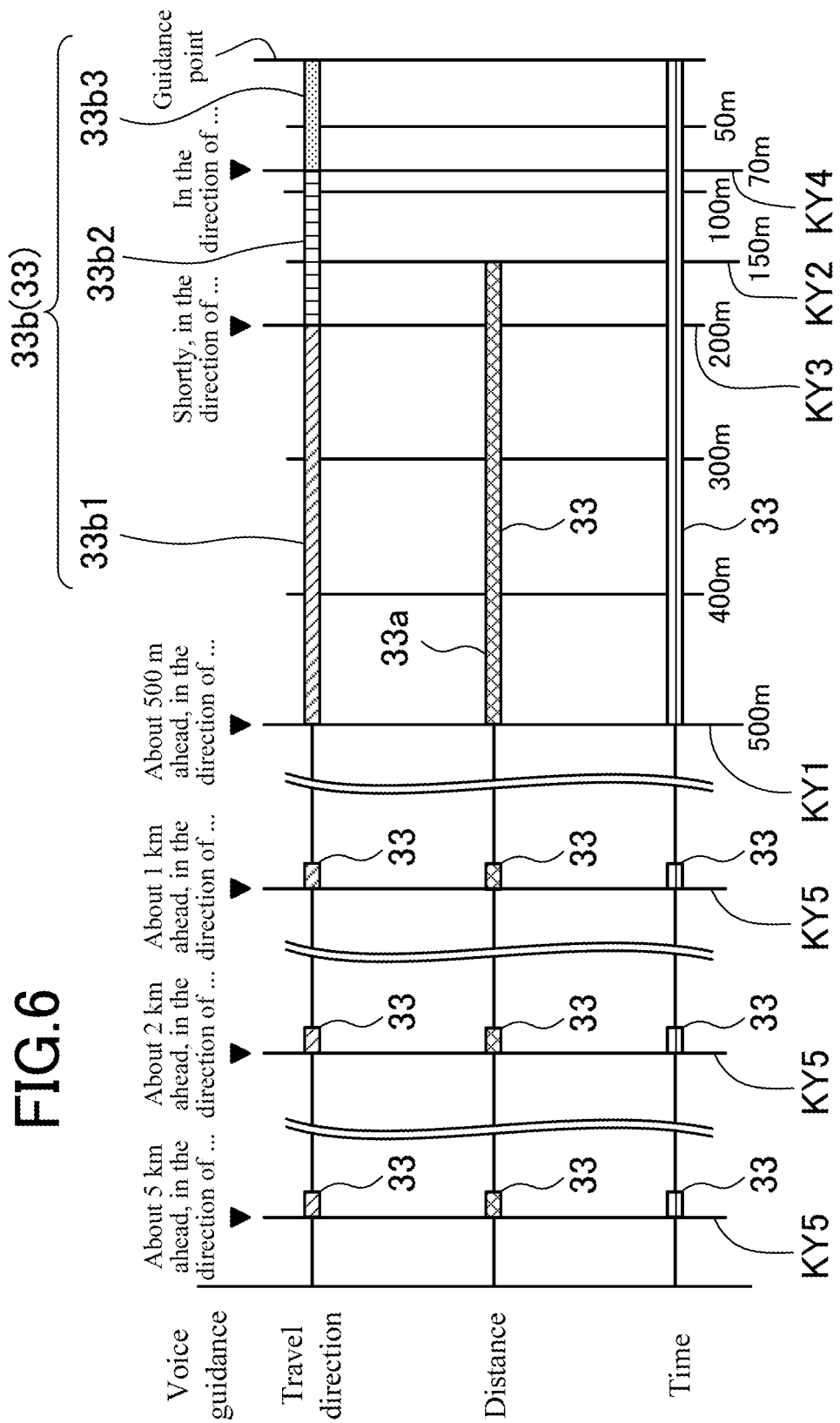
FIG. 6 is a view showing, in time series, when each of the display contents of a guidance image outputted by an image output portion of the display light emitting device is displayed until a guidance point is reached.

At step S107, the LCOS 32*d* continues to emit display light to display the guidance image 33 on the combiner 26 for ten seconds. In the guidance image 33, as shown in FIGS. 6 and 7, the numerical value of the distance image 33*a*, the arrow of the direction image 33*b* of the direction of travel, the time image 33*c* (time required to arrive) and the time-of-day image 33*d* (estimated time of arrival) are displayed.

The value of 5 km as the distance image 33a, the right-turn arrow as the direction image 33b, six minutes as the required time of the time image 33c and ten o'clock as the estimated time of arrival of the time-of-day image 33d shown in FIG. 7 are merely samples and are not the actual numerical values and required time. Moreover, as shown in FIG. 6, an announcement "About 5 km ahead, in the direction of . . ." is provided by voice guidance. At this location of travel, since the distance D to the guidance point is not not more than 500 m and it is unnecessary to display the guidance image 33 all the time, the guidance image 33 is displayed only for a short period of time. While this guidance image 33 is displayed, the GDC 32c of the image control module 32 generates the guidance image 33 by combining with the information of the flash ROM 32b in accordance with an instruction from the microcomputer 32a, and the LCOS 32d emits display light to display the guidance image 33 generated by the GDC 32c on the combiner 26. Since the distance received by the Bluetooth module 31 is updated every second, the numerical value of the distance image 33a of the generated guidance image 33 is also updated every second. Moreover, not only the numerical value of the distance image 33a of the guidance image 33 but also the display of the time image 33c and the display of the clock diagram of the time-of-day image 33d are also updated every second. Then, when ten seconds have elapsed since the start of the display light emission by the LCOS 32d, the display light emission by the LCOS 32d is ended, and the process proceeds to step S108.

At step S108, after the microcomputer 32a adds 1 to the count value k to make the count value k=2, the process returns to step S102.

Then, at step S102, anew distance D is received. Thereafter, whether or not the new distance D obtained at step S102 is not more than $R_2$, that is, not more than $R_2$=4 km (fifth reference distance KY5) is determined at step S103. Under a condition where it is not not more than 4 km, the determination result is NO, and the process is returned to S102 without the emission of the display light. Under this condition, since display light is not emitted, the guidance image 33 is not displayed, either. Since the distance D at the current location of travel is between 5 km and 4 km and the distance D is updated every second, the motorcycle runs without the guidance image 33 displayed until the display condition of the guidance image 33 is satisfied.

Then, when the distance D updated every second becomes D≤4 km, since it is determined at step S103 that the distance D is not more than 4 km, the process proceeds to step S107 through steps S105 and step S106, and the guidance image 33 in accordance with the distance at that time is displayed for ten seconds. Thereafter, the process proceeds to step S108, the count value becomes k=3, and the process returns to step S102.

In this manner, short-time display of the guidance image 33 as described above is repeated when $R_k$ becomes $R_3$, $R_4$ and $R_5$. That is, when $R_k$ becomes $R_3$=3 km (fifth reference distance KY5), $R_4$=2 km (fifth reference distance KY5) and $R_5$=1 km, for example, the guidance image 33 as shown in FIG. 6 is displayed for ten seconds. When the process proceeds to step S108 after the guidance image 33 is displayed for ten seconds every time the location where $R_5$=1 km is passed, k=k+1, that is, k=6 and $R_k$=$R_6$=500 m. Then, the process returns to step S102.

Thereafter, the process proceeds from step S102 to step S103, and it is determined whether or not the distance D to the guidance point is not more than 500 m (first reference distance KYT) that is a distance near the guidance point.

When the distance D becomes not more than 500 m, since the determination result is YES and D $R_k$ ($R_k$=$R_6$=500 m) is satisfied at step S103, the process proceeds to step S105. At step S205, whether k=6 or not is determined. Since k=6 under this running condition, the determination result is YES, and the process proceeds to step S109.

At step S109, display as a distance near the guidance point is provided. That is, the process proceeds to step S109 and display light to display the guidance image 33 on the combiner 26 continues to be emitted until D=0 km (guidance point). At this time, the GDC 32c generates the guidance image 33 in accordance with an instruction from the microcomputer 32a, and the LCOS 32d emits display light to display the guidance image 33 generated by the GDC 32c on the combiner 26. Specifically, as shown in FIGS. 6 and 7, in the guidance image 33, the distance image 33a to the guidance point is displayed by a black numerical value on the right side in the upper row, and the direction image 33b at the guidance point is displayed by a blue arrow on the left side in the upper row. The display image of this direction image 33b will be referred to as first route direction image 33b1. Moreover, in the guidance image 33, the time image 33c as the time required to reach the guidance point is displayed by black numerical value on the right side in the lower row, and the clock diagram of the time-of-day image 33d as the estimated time of arrival is displayed in black on the left side in the lower row. The guidance image 33 when the first reference distance KY1 is reached is the same as the guidance image 33 displayed for ten seconds when each fifth reference distance KY5 is reached, and is different in that it is displayed all the time. Moreover, since the distance received by the Bluetooth module 31 is updated every second, the generated guidance image 33 is also updated every second. That is, the numerical value of the distance image 33a is updated every second. Then, the process proceeds to step S110.

At step S110, it is determined whether the distance D indicated by the distance information received by the Bluetooth module 31 is not more than 200 mm (third reference distance KY3) or not. When the distance D is not not more than 200 m at step S109, the determination result is NO, and the process returns to step S109. On the other hand, when the distance D becomes not more than 200 mm, the determination result is YES, and the process proceeds to step S111.

Figure 8:
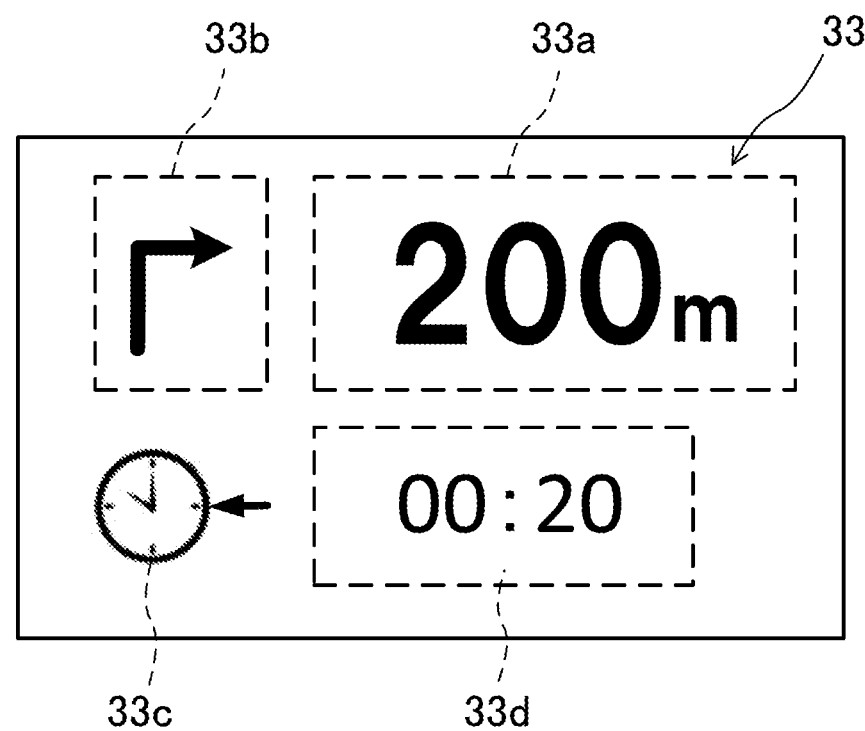
FIG. 8 is a view showing an example of the guidance image outputted by the image output portion of the display light emitting device according to the first embodiment of the present invention.

At step S111, as shown in FIGS. 6 and 8, the first route direction image 33b1 which is the display image of the blue arrow of the guidance image 33 is changed to a second route direction image 33b2 which is the display image of a yellow arrow, thereby inviting the driver's attention in the direction of travel, and the process proceeds to step S112.

At step S112, it is determined whether the distance D indicated by the distance information received by the Bluetooth module 31 is not more than 150 m (second reference distance KY2) or not. When the distance D is not not more than 150 mat step S112, the determination result is NO, and the process returns to step S111. On the other hand, when the distance D becomes not more than 150 m, the determination result is YES, and the process proceeds to step S113.

Figure 9:
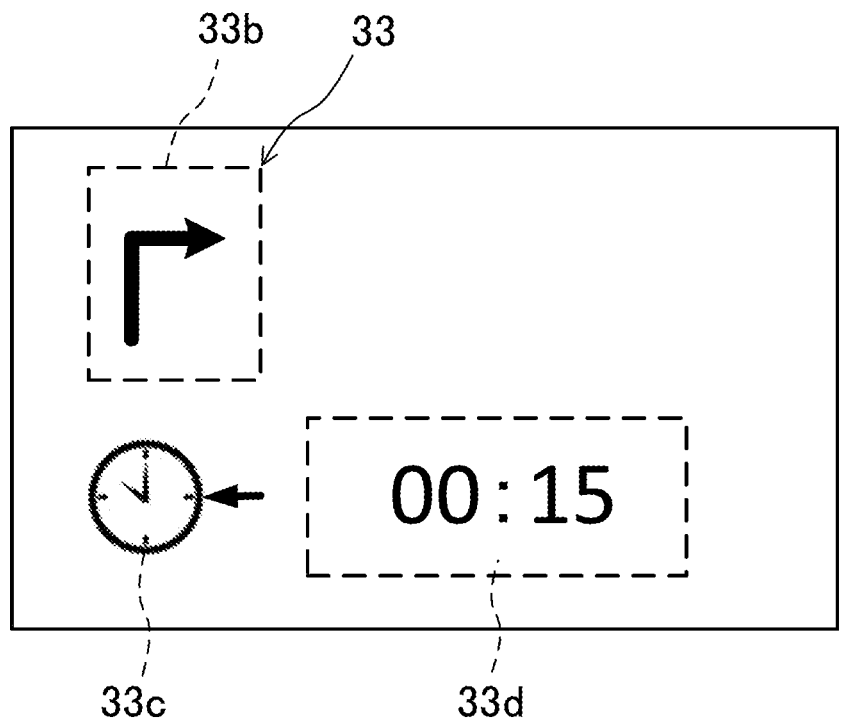
FIG. 9 is a view showing an example of the guidance image outputted by the image output portion of the display light emitting device according to the first embodiment of the present invention.

At step S113, as shown in FIGS. 6 and 9, the numerical display of the distance image 33a of the guidance image 33 is erased so as not to be displayed. By doing this, the driver is made to recognize that it is hardly worth displaying the distance in the guidance image 33 because the distance D to the guidance point is considerably near, and the display of the direction of travel in the guidance image 33 is made conspicuous; thereafter, the process proceeds to step S114. While the time image 33c and the time-of-day image 33d in the guidance image 33 are displayed as they are in the guidance image 33 at this time, these displays may also be erased.

At step S114, it is determined whether the distance D indicated by the distance information received by the Bluetooth module 31 is not more than 70 m (fourth reference distance KY4) or not. When the distance D is not not more than 70 mat step S114, the determination result is NO, and the process returns to step S113. On the other hand, when the distance D becomes not more than 70 m, the determination result is YES, and the process proceeds to step S115.

Figure 10:
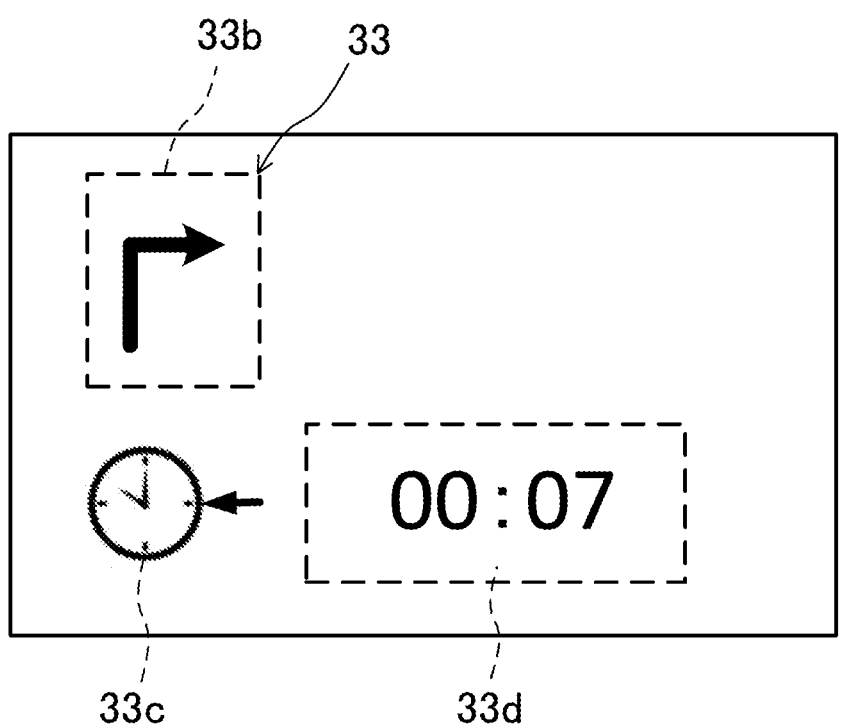
FIG. 10 is a view showing an example of the guidance image outputted by the image output portion of the display light emitting device according to the first embodiment of the present invention.

At step S115, as shown in FIGS. 6 and 10, under a condition where the numerical display of the distance image 33*a* in the guidance image 33 is erased, the display image of the yellow arrow of the second route direction image 33*b*2 is changed to a third route direction image 33*b*3 formed of a display image of a red arrow, thereby further inviting the driver's attention to the direction of travel, and the process proceeds to step S116. While the time image 33*c* and the time-of-day image 33*d* in the guidance image 33 are displayed as they are in the guidance image 33 at this time, these displays may also be erased.

At step S116, it is determined whether the distance D indicated by the distance information received by the Bluetooth module 31 is 0 m or not. When the distance D is not 0 mat step S116, the determination result is NO, and the process returns to step S115. On the other hand, when the distance D becomes 0 m, the determination result is YES, and all the display light emitted from the LCOS 32*d* is turned off and the display of the guidance image 33 in the stationary condition is ended. After the end of these stationary operations, the guidance point is switched, and the next stationary operations are continuously performed.

As described above, according to the first embodiment, when the distance D to the guidance point becomes near the guidance point, the display color of the travel direction of the direction image 33*b* is successively changed, for example, from blue to yellow and from yellow to red so as to be conspicuous, so that the driver's attention is attracted more to the direction of travel than to the distance information. When the location at a distance near the guidance point is reached, the display of the distance image 33*a* is stopped and the display of the direction image 33*b* is continued, so that not only the driver can strongly recognize that the guidance point is approaching but also the distance image 33*a* can be prevented from obstructing a correct judgement by the driver.

In particular, in the first embodiment, since the display image color of the arrow of 200 m (third reference distance KY3) is changed from blue to yellow and the distance display is stopped at the point of 150 m (second reference distance KY2) after this color change, the driver's attention is more strongly focused on the direction of travel. Thereafter, since the display image color of the arrow of the direction image 33*b* is changed from yellow to red at the point of 70 m (fourth reference distance KY4), the driver's attention is further focused on the direction of travel, so that the motorcycle can travel according to the guidance without mistaking a wrong direction for the direction of travel at the guidance point. In particular, since the navigation system is such that the numerical value itself of the distance is indicated by a rough numerical value in units of several hundreds of meters, if the distance image 33*a* is displayed adhering to numerical values of short distances, there is a possibility that the motorcycle runs with the distance to the guidance point not coinciding with the distance displayed in the distance image 33*a*. Therefore, in the first embodiment, by daring to erase the display of the distance numerical value when the distance (150 m=the second reference distance KY2) near the guidance point is reached, the driver can drive with attention focused on the direction image 33*b* without adhering to the distance numerical value.

Figure 5:
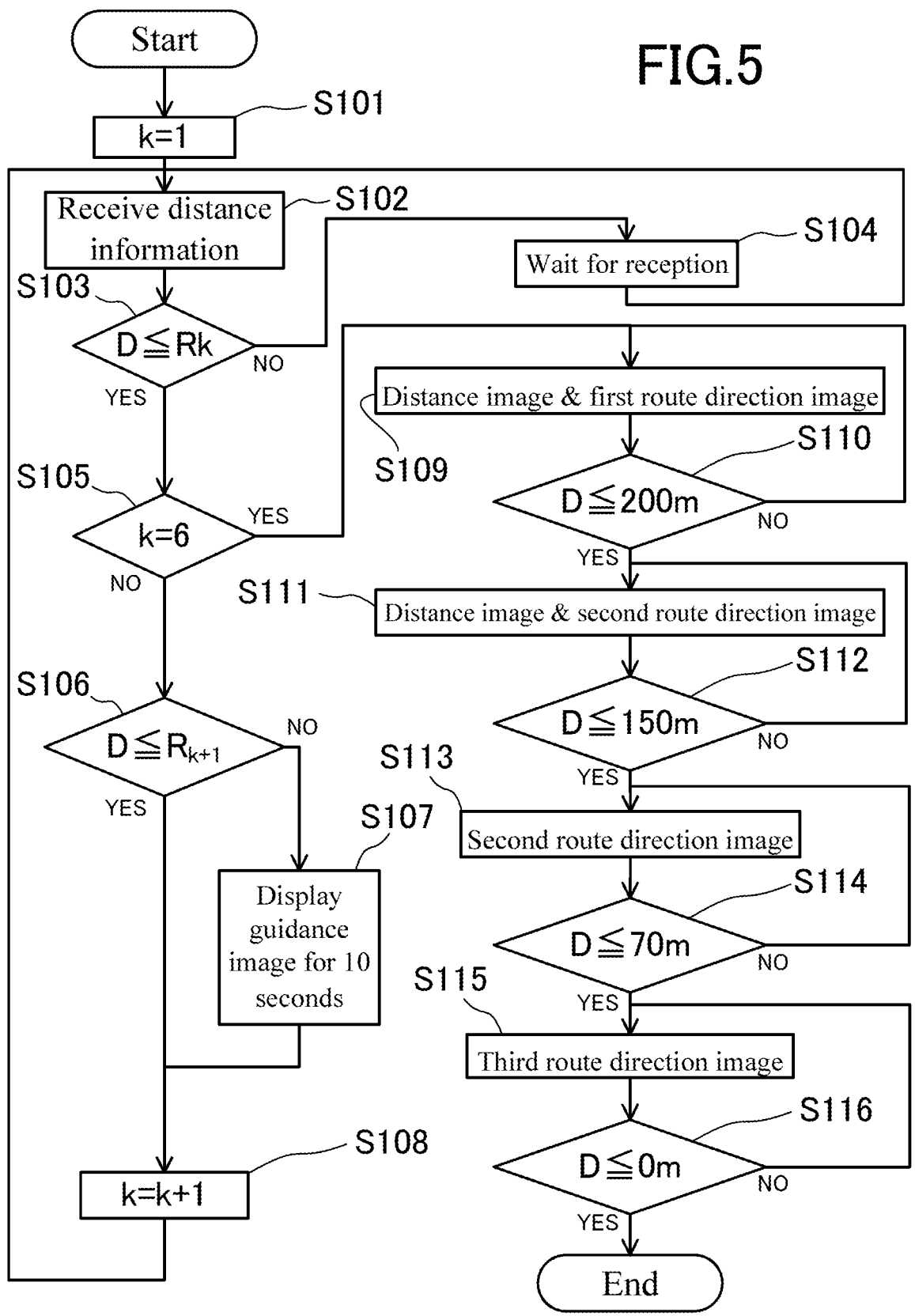
FIG. 5 is a flowchart showing an operation of a stationary state executed by the display light emitting device according to the first embodiment of the present invention.

While in the above description of the stationary operation, a case in which the navigation system 1 is activated at a location where the motorcycle is not less than 5 km away from the guidance point is described as an example, the display light emitting device 30 operates according to the flowchart shown in FIG. 5 also when the navigation system 1 is activated at a location where the motorcycle is less than 5 km away from the guidance point. A case in which the navigation system 1 is activated, for example, at a location where the motorcycle is 3.4 km away from the guidance point will be described as an example. Regarding steps similar to the above-described ones, brief description will be given.

When the first switch 23 is long-pressed at a location where the motorcycle is 3.4 km away from the guidance point, the display light emitting device 30 of the head-up display device 40 is activated, and at step S101, the count value k is initialized to 1 by the microcomputer 32*a*.

Then, at step S102, the Bluetooth module 31 receives the distance information updated and transmitted every second from the smartphone 10 where the car navigation application 14*b* is running, and the process proceeds to step S103.

At step S103, whether a distance condition that the distance D≤$R_1$ ($R_1$=5 km) is satisfied or not is determined. Since D=3.4 km, determining that the display condition is satisfied, the process proceeds to step S105.

At step S105, whether the count value k is k=6 or not is determined. Since the count value k is k=1, the process proceeds to step S106.

At step S106, whether the distance D≤$R_{k+1}$ ($R_{k+1}$=$R_2$=4 km) is satisfied or not is determined. Since the distance D=3.4 km and D≤4 km is satisfied, the process proceeds to step S108.

At step S108, after the microcomputer 32*a* adds 1 to the count value k to thereby make the count value k=2, the process returns to S102.

Then, when a new distance D is received at step S102, whether the distance D is not more than $R_2$, that is, not more than $R_k$=$R_2$=4 km or not is determined at step S103. Since the current point is a location where D=3.4 km, determining that the determination condition is satisfied, the process proceeds to step S105.

At step S105, whether the count value k is k=6 or not is determined. At this time, since the count value k is k=2 and not k=6, determining that the determination condition is not satisfied, the process proceeds to step S106.

At step S106, whether D≤$R_{k+1}$ is satisfied or not is determined. Since $R_{k+1}$=$R_3$=3 km and the current distance D is D=3.4 km, the determination condition D(3.4 km)≤$R_3$(3 km) is not satisfied. Therefore, the process proceeds to step S107. The steps above are executed in several milliseconds.

At step S107, a guidance image 33 at a location where the current point is D=3.4 km is generated by the image control module 32, and display light of the guidance image 33 is emitted by the LCOS 32*d* and displayed on the combiner 26 for ten seconds. Then, after ten seconds have elapsed since the start of the display light emission, the LCOS 32*d* ends the display light emission, and the process proceeds to step S108.

At step S108, the count value k is made k=3, and the process returns to step S102. In this way, when $R_k$ successively becomes $R_3$, $R_4$ and $R_5$ and the current point becomes 3 km, 2 km and 1 km, the ten-second display of each guidance image 33 is performed. Then, when $R_k$ becomes $R_6$ and the current point becomes a location 500 m away from the guidance point, the all-time display of the guidance image 33 is performed.

As described above, when the current location is at a point 3.4 km away from the guidance point, the operation is executed until the count value k becomes from k=1 to k=2 according to the flow chart shown in FIG. 5 to identify the current location, the ten-second display of the guidance image 33 is executed at this point, and thereafter, the ten-second display of the guidance image 33 is repeated at the points of 3 km, 2 km and 1 km. Thereafter, when $R_k$ becomes $R_6$ and the current location is a location 500 m away from the guidance point, the all-time display of the guidance image 33 is executed.

Moreover, when the first switch 23 is long-pressed at a location where the motorcycle is 0.4 km away from the guidance point, the display light emitting device 30 of the head-up display device 40 is activated. After the count value k is initialized to 1 at step S101, steps as described above are repeated until the count value k successively becomes from k=1 to k=6. When k=6 after the determination is made at step S105, the process proceeds to step S109, and the above-described display operation for when the guidance point is approaching is executed. That is, the display of the guidance image 33 at a location near the guidance point is executed without the ten-second display of the guidance image 33 being executed.

As described above, in the flowchart shown in FIG. 5, in a case where the navigation system 1 is activated and the stationary operation is performed, for example, when the navigation system 1 is actuated at a location not less than 5 km away from the guidance point, the guidance image 33 is displayed for ten seconds at locations 5 km, 4 km, 3 km, 2 km and 1 km away from the guidance point, and the location not more than 500 m away from the guidance point is reached, the guidance image 33 is displayed all the time. Moreover, when the navigation system 1 is activated at a location nearer to the guidance point than the location 5 km away from the guidance point, since whether the current location is between $R_k$ and $R_{k+1}$ or the count value k=6 or not is immediately determined, the current location can be instantaneously grasped and the necessary steps can be executed. That is, when the navigation system 1 is activated, by executing the flow to successively increase the count value k by one from 1, the current location of the driver can be instantaneously identified and the necessary steps can be executed at any location.

In particular, when the distance to the guidance point becomes a near distance of not more than 500 mm (first reference distance KY1), the guidance image 33 is displayed all the time to provide guidance, and at a location extremely near the guidance point (second reference distance KY2), for example, at a location 150 m away from the guidance point, the display of the distance image 33*a* of the guidance image 33 is stopped and guidance is provided only by the direction image 33*b*, so that the driver can drive on a correct route according to the direction information without influenced by the distance information at a location extremely near the guidance point.

In common navigation systems, since the guidance point of the vehicle is measured and displayed by a rough value of approximately several hundreds of meters, the numerical value of the distance can be incorrect at an extremely near location within several hundreds of meters from the guidance point. On the contrary, according to the present invention, since the distance image 33*a* as the distance information is erased when a location extremely near the guidance point is reached as described above, the driver is never misled by the distance image 33*a* when guided to the guidance point by the guidance image 33. In that case, since the driver's attention is further paid on the direction image 33*b* by changing the display condition of the direction image 33*b* so as to be conspicuous, the driver's attention to the direction image 33*b* increases, so that the driver can surely drive to the guidance point according to the direction information.

It is preferable that the second reference distance as the distance to a location extremely near the guidance point be approximately 100 to 200 m.

Second Embodiment

A second embodiment will be described based on FIG. 11. The second embodiment is different from the first embodiment in that the distance information of the guidance image 33 shown when the driver reaches the fourth reference distance (70 m) is changed, and is the same as the first embodiment except for this.

Figure 11:
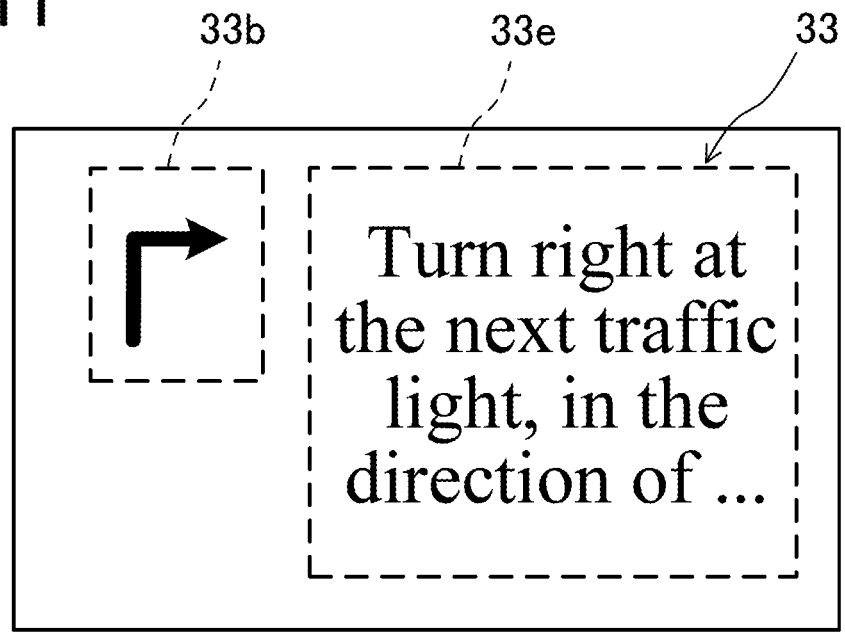
FIG. 11 is a view showing a guidance image outputted by the image output portion of a display light emitting device according to a second embodiment of the present invention.

That is, as shown in FIG. 11, the direction image 33*b* of the guidance image 33 is displayed in a similar manner to the direction image 33*b* of the first embodiment, and an easy-to-understand display is provided by a character image 33*e* "Turn right at the next traffic light, in the direction of . . . " indicating the direction of travel at the guidance point by characters. At this time, the time image is erased together with the distance information.

In this second embodiment, since information on the intersection at the guidance point is displayed in the guidance image 33 in detail and in an easy-to-understand manner, the driver can be made less likely to make a mistake in the direction of travel at the guidance point.

Third Embodiment

A third embodiment will be described based on FIG. 12. The third embodiment is different from the first embodiment in that the guidance image 33 displayed when the driver reaches the fourth reference distance (70 m) is changed, and is the same as the first embodiment except for this.

Figure 12:
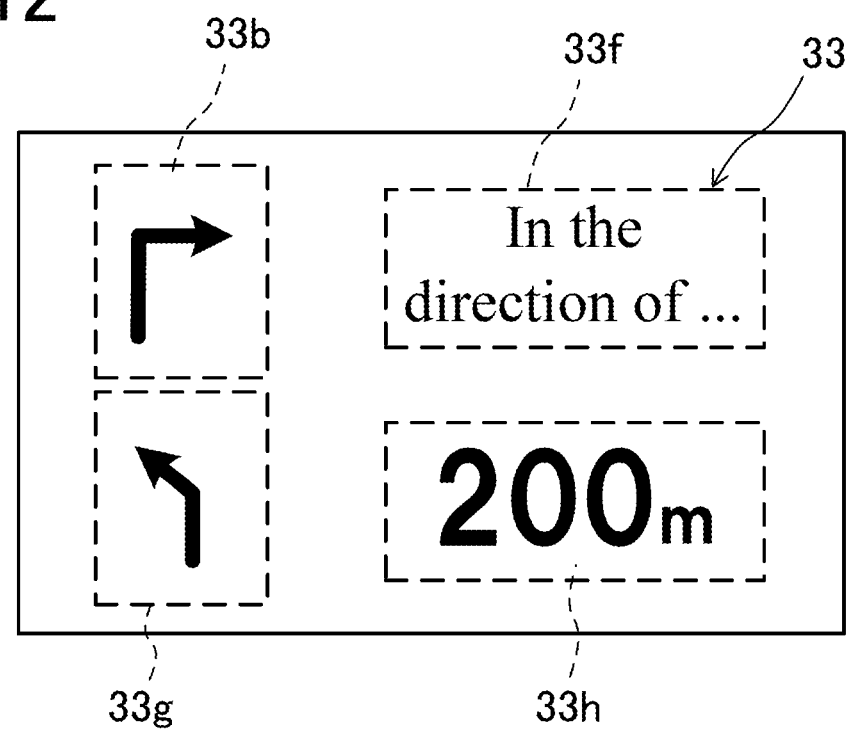
FIG. 12 is a view showing a guidance image outputted by the image output portion of a display light emitting device according to a third embodiment of the present invention.

That is, in the third embodiment, for example, as shown in FIG. 12, a phrase "in the direction of . . . " which is an explanation by voice is displayed also by a character image 33*f* as it is in the guidance image 33 so as to be easy-to-understand. Further, in the lower row of the guidance image 33, the arrow of a direction image 33*g* and the numerical value of a distance image 33*h* at the guidance point next to the currently explained guidance point are displayed next to each other. By adding these pieces of information at the next guidance point to the guidance image 33, the information on the next guidance point becomes clear, so that the driver can drive at ease. In particular, how much distance there is to the next guidance point or in which direction the next guidance point is can be easily understand, so that the driver can drive without making a mistake in the direction of travel. As described above, in a case where the next guidance point is near the currently explained guidance point and information on the next guidance point is immediately required, for example, during driving in a labyrinthine urban area, when the intersection as the guidance point explained next to the currently explained guidance point is located at a near distance such as 50 m or 100 m from the currently explained guidance point, the driver can drive without making a mistake in the direction of travel.

OTHER EMBODIMENTS

Moreover, in the above-described first to third embodiments, the LCOS 32d may emit display light in such a manner that the guidance image 33 is faded in when the display of the guidance image 33 by the stationary operation is started and that the guidance image is faded out when the display of the guidance image by the stationary operation is ended. By doing this, when the display of the guidance image 33 is started, the guidance image 33 displayed on the combiner 26 gradually increases in brightness, whereas when the display of the guidance image 33 is ended, the guidance image 33 displayed on the combiner 26 gradually decreases in brightness, so that strain on the eyes of the driver wearing the helmet 20 can be reduced.

Moreover, while in the above-described first to third embodiments, the color of the arrow is changed from blue to yellow and from yellow to red as an example of the change of the display image of the direction image 33b, the present invention is not limited to these colors but different colors may be used. Moreover, the change display of the direction image 33b is only necessarily a display that is conspicuous to such an extent not as to be an obstruction during traveling; for example, the flashing condition of the arrow, the thickness and size of the arrow, a combination thereof and the like may be changed for display.

Moreover, while in the above-described first to third embodiments, the first reference distance is set to 500 m, the third reference distance, to 200 m, the second reference distance, to 150 m and the fourth reference distance, to 70, these numerical values are examples and different numerical values may be used.

Moreover, the above-mentioned numerical values may be changed according to the speed of the vehicle. The above-mentioned numerical values may be changed according to the congestion condition, the number of driving lanes, the road width and the like. Moreover, the above-mentioned numerical values may be changed according to an intersection, an express way, an interchange or the like.

Although it is more noticeable to the driver's eyes that the positions where the color of the arrow of the direction image 33b is changed, that is, the position of 200 m of the third reference distance and the position of 70 m of the fourth reference distance are different from the position where the display of the distance image 33a disappears, that is, the position of 150 m of the second reference distance, the positions may be the same.

While the numerical values of the first reference distance, the second reference distance, the third reference distance, the fourth reference distance and the fifth reference distance are automatically set, they may be changed manually.

The numerical values of the first reference distance, the second reference distance, the third reference distance, the fourth reference distance and the fifth reference distance, that is, 500 m, 1 km, 2 km, 3 km, 4 km and 5 km are examples, and the present invention is not limited to these numerical values; they may be 3 km, 2 km, 1 km, 500 m or may be 3 km, 2.5 km, 2 km, 1.5 km, 1 km, 500 m and 300 m.

In particular, at a location farther from the guidance point than the location at the first reference distance (500 m) from the guidance point, display is executed every predetermined distance (1 km) longer than the first reference distance, whereas when the first reference distance is shorter than 1 km, a different numerical value may be used.

While the guidance image 33 when the driver is at a location 500 m away from the guidance point and the guidance images 33 when the driver is at locations 5 km, 4 km, 3 km, 2 km and 1 km are of the same kind, different guidance images 33 may be displayed at the locations.

While in the first to third embodiments, ten seconds are shown as an example of the short time during which the guidance image 33 is displayed at the location of the fifth reference distance, this numerical value is merely an example and the present invention is not limited to this numerical value. That is, since it is necessary only that the driver can quickly recognize that the landmark distance is reached while driving and if the driver can recognize it, it is preferable to quickly erase the display to increase the field of view, the display time may be shorter than ten seconds. On the contrary, since the driver is hindered from making a correct judgement if the display time is too long, it is preferable that the display time be not more than 30 seconds at the longest.

When the navigation system 1 is activated at a location not less than 5 km away from the guidance point, although no stationary operation is performed for the guidance image 33, a different guidance image may be displayed, or voice information may be provided. For example, a voice such that "The guidance point is not less than 5 km away. Please continue driving along the traveling road." may be outputted.

INDUSTRIAL APPLICABILITY

The present invention is usable as a display light emitting device that emits display light to display a guidance image on a combiner mounted on a helmet.

DESCRIPTION OF REFERENCE CHARACTERS

1 Navigation system
10 Communication device smartphone
20 Helmet
26 Combiner
30 Display light emitting device
31 Bluetooth module (wireless communication portion)
32 Image control module
32s Microcomputer
32b Flash ROM
32c GDC (image generating portion)
32d LCOS (image emitting portion)
33 Guidance image
33a Distance image
33b Direction image
33b1 First route direction image
33b2 Second route direction image
33b3 Third route direction image
33c Time image
33d Time-of-day image
40 Head-up display device
KY1 First reference distance
KY2 Second reference distance
KY3 Third reference distance
KY4 Fourth reference distance
KY5 Fifth reference distance

The invention claimed is:
1. A display light emitting device that emits display light to display a guidance image on a combiner mounted on a helmet, comprising: a wireless communication portion that receives, from a communication device, guidance information including distance information indicative of a distance from a current location to a predetermined guidance point and direction information indicative of a direction of travel at the guidance point; and an image control module having: an image generating portion that generates a guidance image including a distance image indicative of the distance to the guidance point based on the distance information and a direction image indicative of the direction of travel at the guidance point based on the direction information; and an image emitting portion that emits display light to display the guidance image on the combiner, and controls operations of the image generating portion and the image emitting portion, wherein the image control module performs control so that, when a condition is satisfied that the distance indicated by the distance information is less than a predetermined first reference distance, the distance image and the direction image are generated by the image generating portion and display light to display the guidance image including the generated distance image and direction image on the combiner is emitted from the image emitting portion, and performs control so that from when a condition is satisfied that the distance indicated by the distance information is less than a second reference distance shorter than the first reference distance to when the guidance point is reached, the display of the distance image of the guidance image is stopped and display light to continue to display the direction image is emitted.

2. The display light emitting device according to claim 1, wherein the image control module performs control so that until a third reference distance shorter than the first reference distance is reached, the direction image generated by the image generating portion is a first route direction image, and that when a condition is satisfied that the distance indicated by the distance information is less than the third reference distance, the direction image generated by the image generating portion continues to be emitted from the image emitting portion to the combiner as a second route direction image formed of a display image different from the first route direction image.

3. The display light emitting device according to claim 2, wherein the image control module performs control so that when a condition is satisfied that the distance indicated by the distance information is less than a fourth reference distance shorter than the third reference distance, a third route direction image formed of a display image different from the first route direction image and the second route direction image is emitted from the image emitting portion to the combiner.

4. The display light emitting device according to claim 3, wherein the second reference distance is shorter than the third reference distance and is longer than the fourth reference distance.

5. The display light emitting device according to claim 3, wherein the first route direction image, the second route direction image and the third route direction image each include an arrow image, and the arrow images of the first route direction image, the second route direction image and the third route direction image are different in display condition.

6. The display light emitting device according to claim 1, wherein the first route direction image and the second route direction image each include an arrow image, and the arrow image of the first route direction image and the arrow image of the second route direction image are different in display condition.

7. The display light emitting device according to claim 1, wherein the distance interval from the location of the second reference distance to the guidance point is shorter than the distance interval from the location of the first reference distance to the location of the second reference distance.

8. The display light emitting device according to claim 1, wherein a fifth reference distance is set that is from the guidance point to a location further away from the guidance point than the location of the first reference distance, the fifth reference distance is set at a plurality of points every distance interval longer than the first reference distance, and the image control module performs control so that the guidance image including the distance image and the direction image is displayed for a set predetermined period of time when each fifth reference distance is reached.

9. The display light emitting device according to claim 8, wherein the display time of the guidance image displayed when the fifth reference distance is reached is not more than 30 seconds.

* * * * *